(No Model.)
F. S. BRADLEY.
BOOK STAPLING MACHINE.
No. 581,507. Patented Apr. 27, 1897.
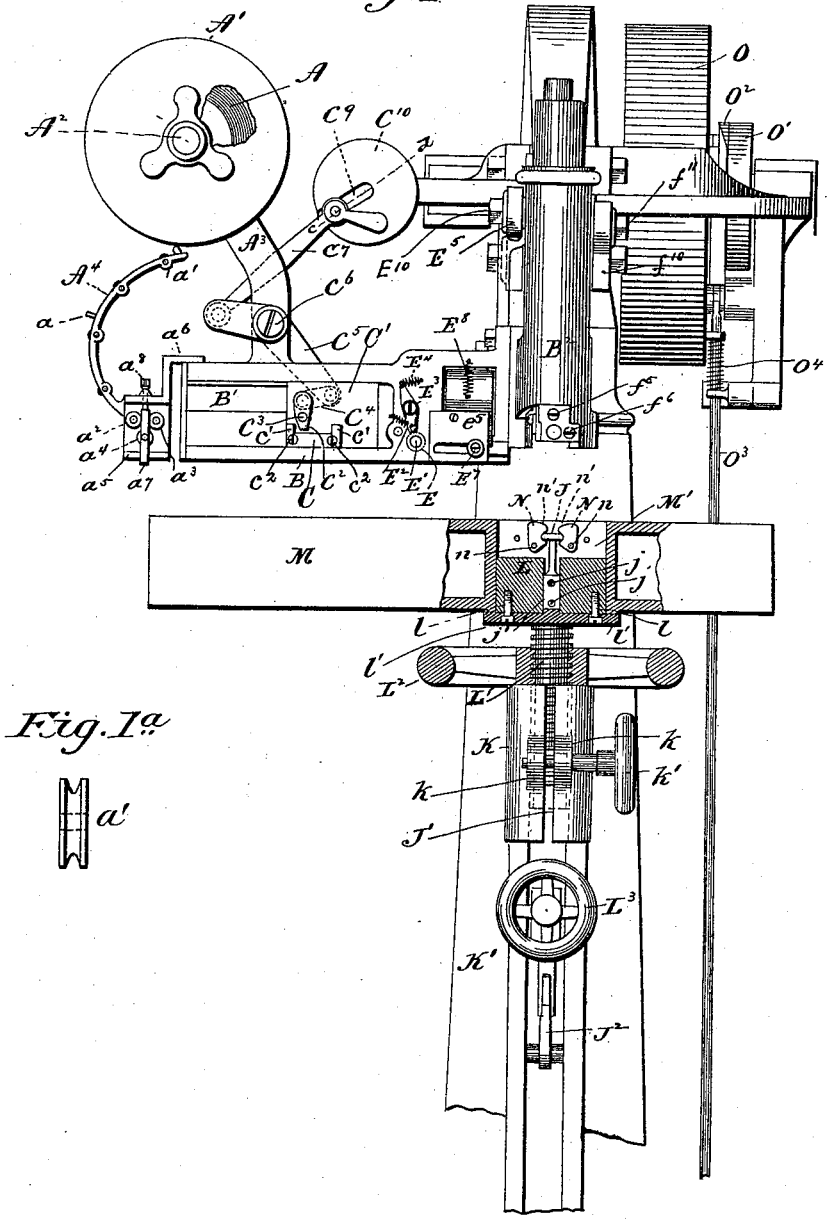

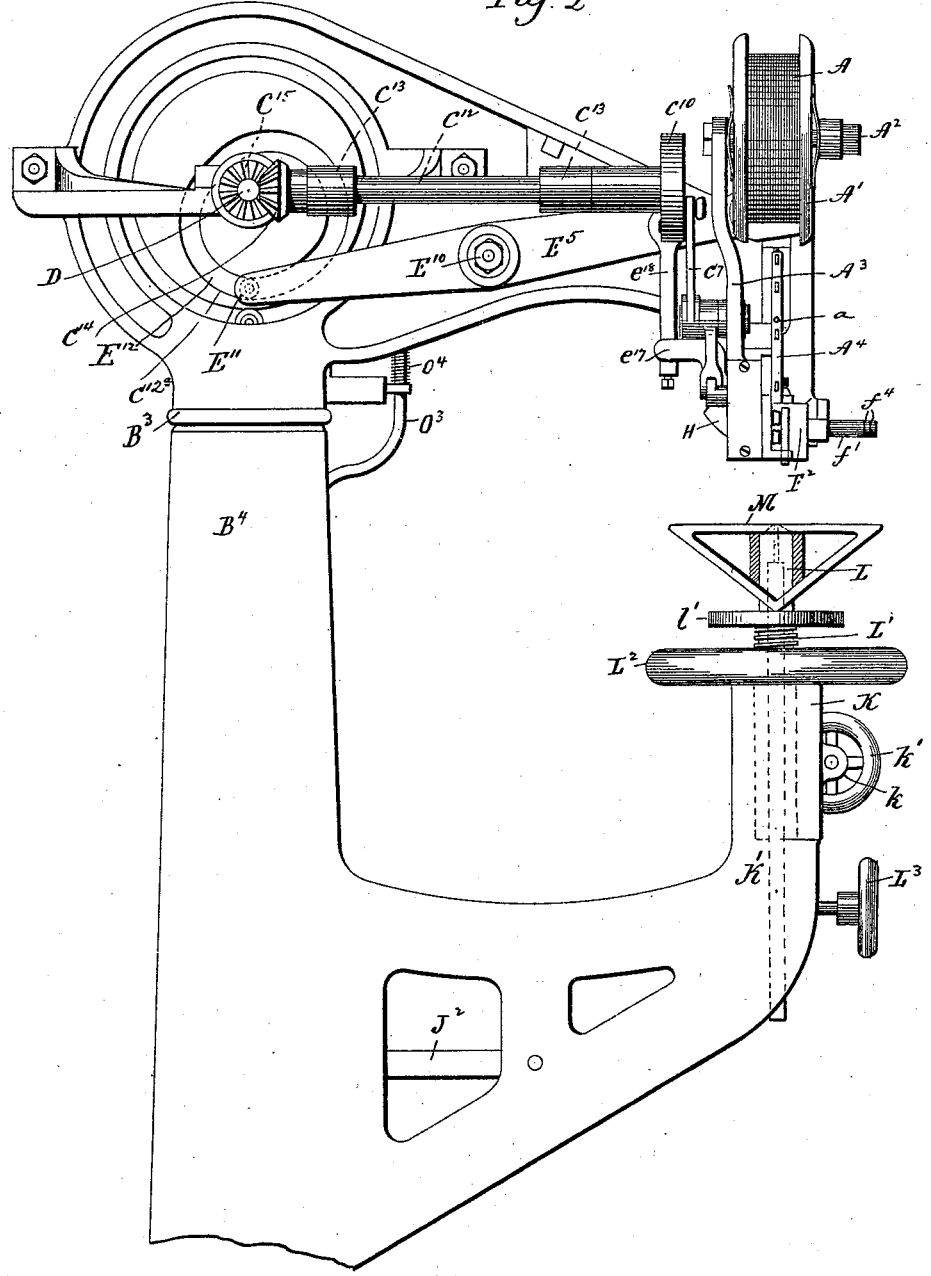

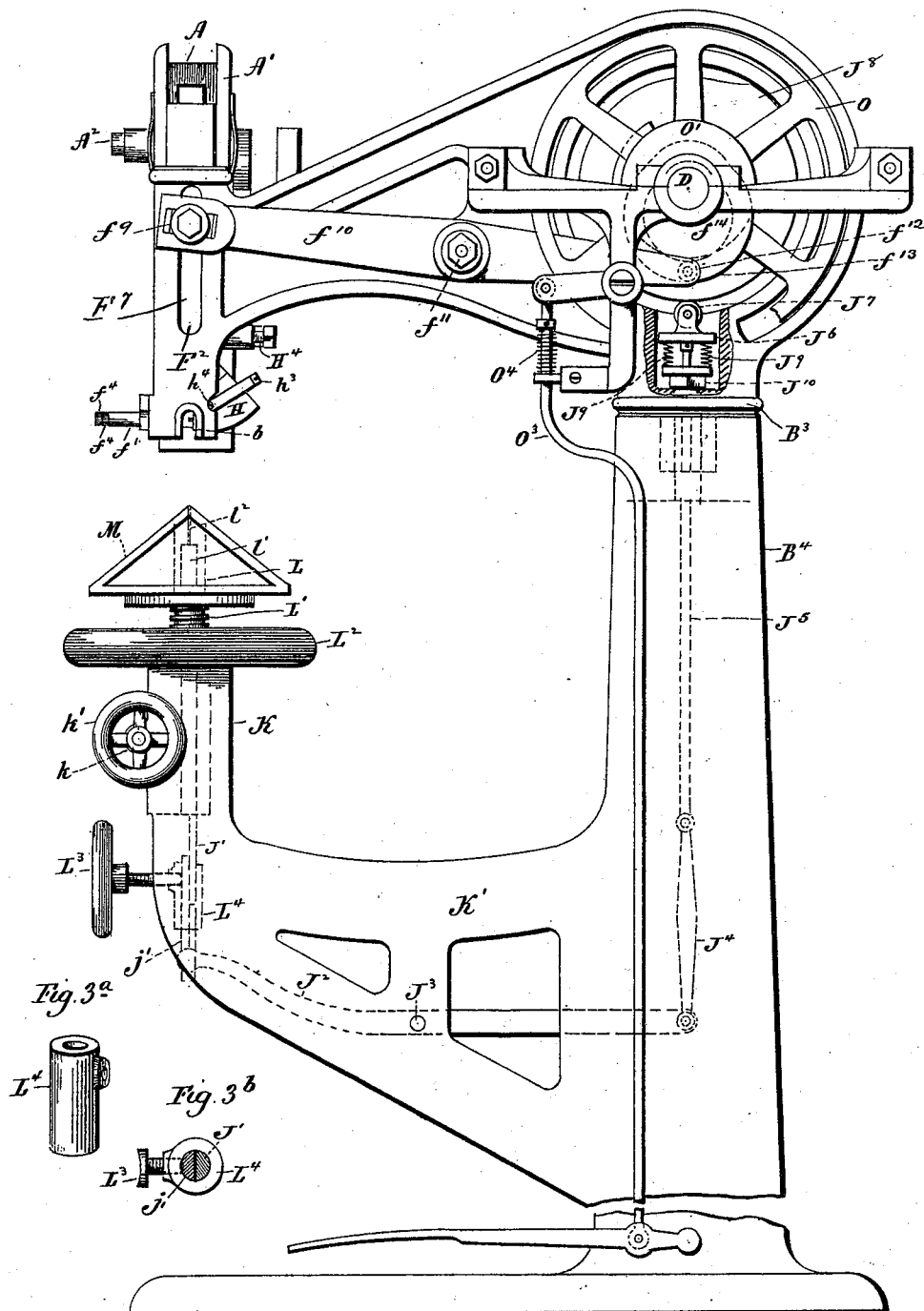

(No Model.)
7 Sheets—Sheet 4.
F. S. BRADLEY.
BOOK STAPLING MACHINE.
No. 581,507.
Patented Apr. 27, 1897.
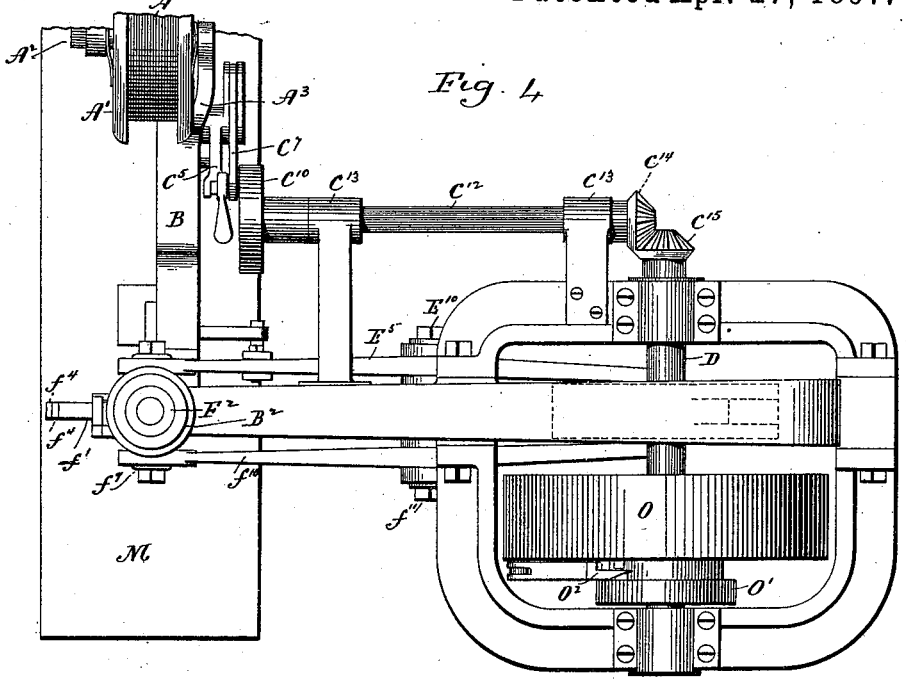
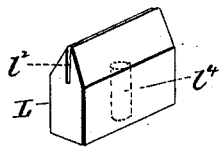
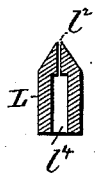
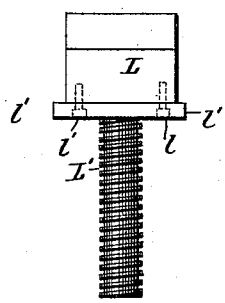
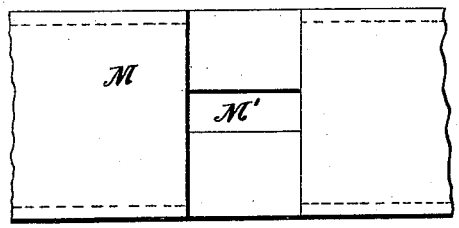

(No Model.) 7 Sheets—Sheet 5.
F. S. BRADLEY.
BOOK STAPLING MACHINE.
No. 581,507. Patented Apr. 27, 1897.
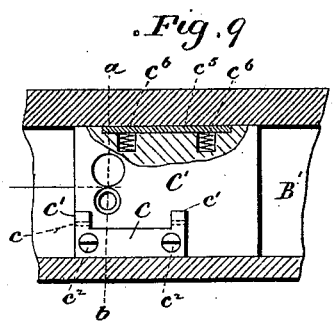
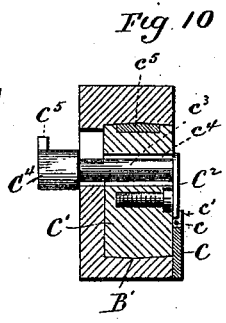
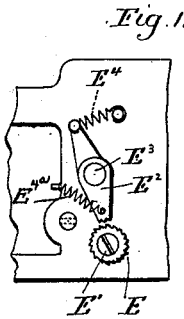
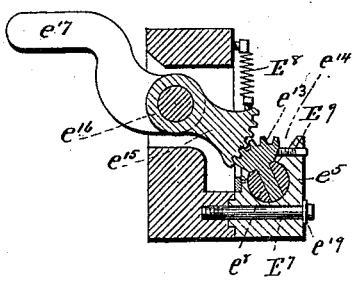
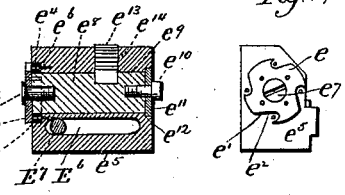
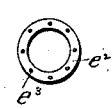
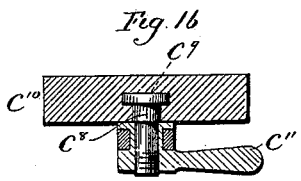

(No Model.) 7 Sheets—Sheet 6.
F. S. BRADLEY.
BOOK STAPLING MACHINE.
No. 581,507. Patented Apr. 27, 1897.
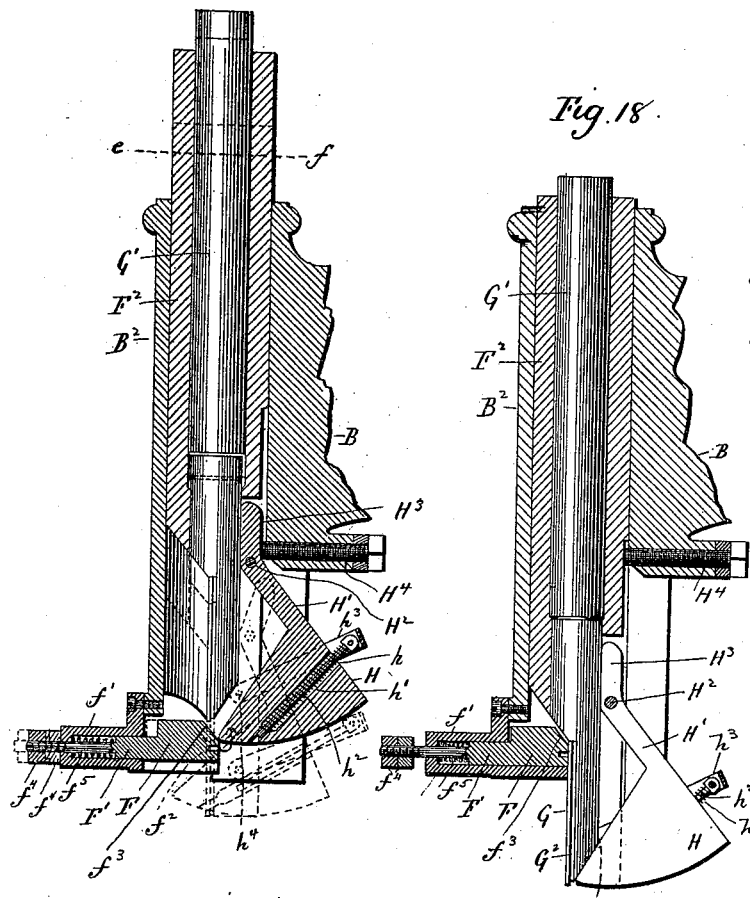
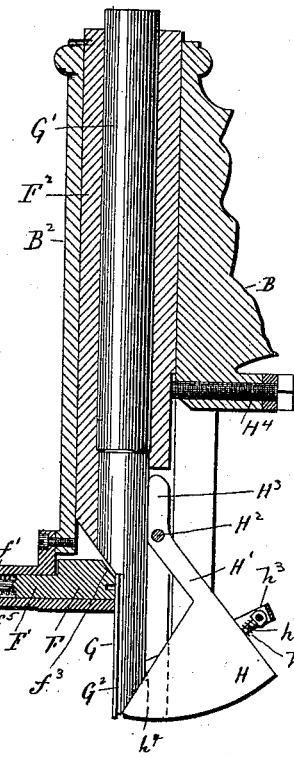
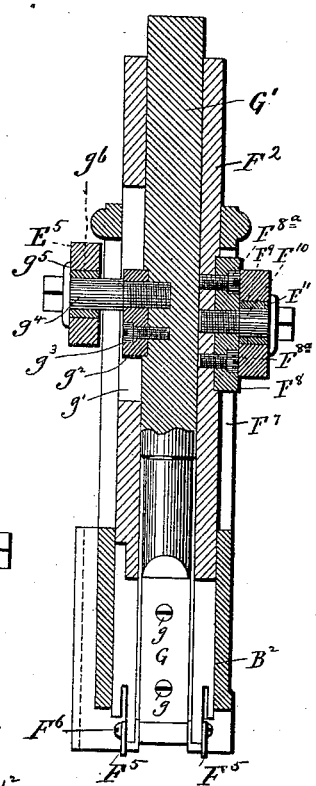
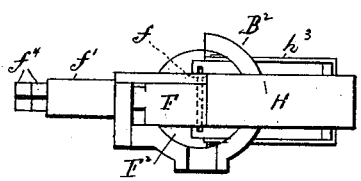
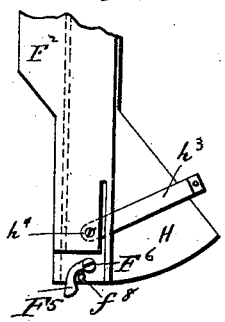
Witnesses
Frank S. Bradley,
Inventor
By attys
Earle & Seymour (No Model.) 7 Sheets—Sheet 7.
F. S. BRADLEY.
BOOK STAPLING MACHINE.
No. 581,507. Patented Apr. 27, 1897.
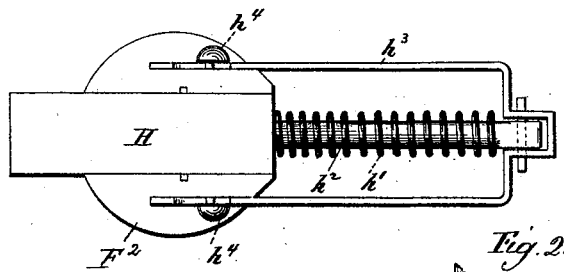
Fig. 22
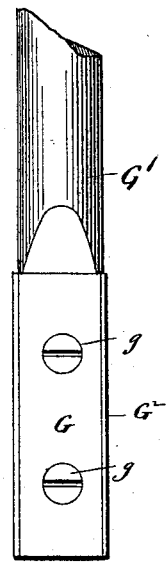
Fig. 24
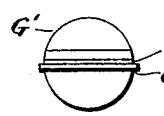
Fig. 26
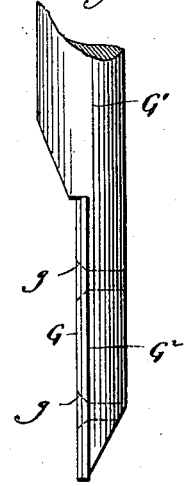
Fig. 25
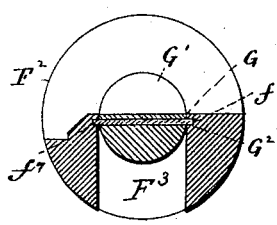
Fig. 27 Fig. 28
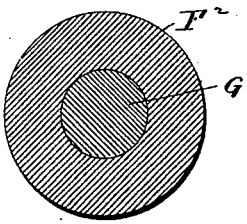
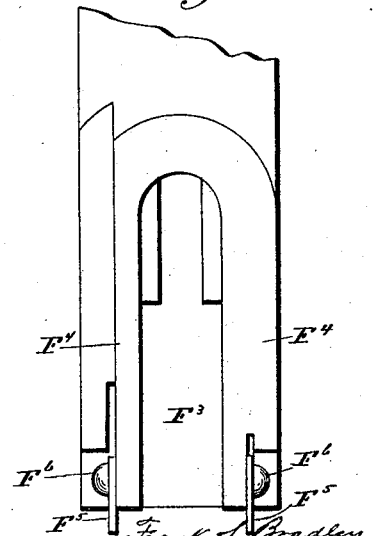
Fig. 23
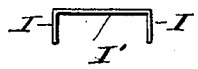
Fig. 29
Fig. 30
Witnesses
J. H. Shumway
Henry A. Bubb
Frank S. Bradley, Inventor.
By atty Earle Seymour

UNITED STATES PATENT OFFICE.

FRANK S. BRADLEY, OF NEW HAVEN, CONNECTICUT.

BOOK-STAPLING MACHINE.

SPECIFICATION forming part of Letters Patent No. 581,507, dated April 27, 1897.

Application filed June 10, 1895. Serial No. 552,254. (No model.)

*To all whom it may concern:*

Be it known that I, FRANK S. BRADLEY, of New Haven, in the county of New Haven and State of Connecticut, have invented a new Improvement in Staple-Stitching Machines; and I do hereby declare the following, when taken in connection with the accompanying drawings and the letters of reference marked thereon, to be a full, clear, and exact description of the same, and which said drawings constitute part of this specification, and represent, in—

Figure 1, a view, partly in front elevation and partly in vertical section, of one form which a machine constructed in accordance with my invention may assume; Fig. 1ª, a detached view of one of the rollers of the longitudinally-bowed reversing-guide; Fig. 2, a view of the machine in side elevation, looking toward the spool containing the wire; Fig. 3, a similar view from the opposite side of the machine; Fig. 3ª, a detached perspective view of the bushing which receives the lapping ends of the two members of the clencher-holder rod; Fig. 3ᵇ, a view in transverse section on the line *e f* of Fig. 3 through the said bushing and rod; Fig. 4, a plan view of the machine; Fig. 5, a detached plan view of the table; Fig. 6, a detached view, in side elevation, of the table-locating block and the table-rest, together with the tubular-threaded stem of the latter; Fig. 7, a detached perspective view of the table-locating block; Fig. 8, a view thereof in central transverse section; Fig. 9, a detached enlarged view of the sliding block of the feeding mechanism, the dog whereof is removed; Fig. 10, a view of the feeding mechanism in transverse section on the line *a b* of Fig. 9; Fig. 11, a detached broken view of the safety mechanism; Fig. 12, a detached sectional view of the cutting-off mechanism; Fig. 13, a detached view, in vertical longitudinal section, of the cutter-block, the rock-shaft therein, and the two cutters; Fig. 14, a detached view, in end elevation, of the cutter-block, showing the cutters; Fig. 15, a detached view, in side elevation, of the annular cutter; Fig. 16, a sectional view on the line *c d* of Fig. 1, showing the means employed for adjusting the play of the sliding block; Fig. 17, a broken view, in vertical longitudinal section, through the barrel, the staple-forming bar, the staple-driving bar, the staple-driver, the anvil, the anvil-holder, and the supporting-block, the parts being shown with the staple-forming bar and the staple-driving bar in their elevated positions; Fig. 18, a similar view with the parts in their depressed positions; Fig. 19, a view of the same parts in vertical section; Fig. 20, a reverse plan view of the parts; Fig. 21, a broken view, in side elevation, of the lower end of the staple-forming bar, showing also the supporting-block and the yoke thereof; Fig. 22, an enlarged reverse plan view of the staple-forming bar, the supporting-block, the yoke, the rod, and the spring which acts upon the said block and is supported by the yoke and rod; Fig. 23, a broken view, in front elevation, of the lower end of the staple-forming bar; Fig. 24, a similar view of the staple-driving bar and staple-driver; Fig. 25, a view of the said parts in side elevation; Fig. 26, a reverse plan view of the said parts; Fig. 27, a view in transverse section through the staple-forming bar, staple-driving bar, and staple-driver, showing how the projecting edges of the staple-driver enter the forming-grooves of the forming-bar; Fig. 28, a view in transverse section through the forming-bar and driver-bar on the line *e f* of Fig. 17; Fig. 29, a detached view of one of the staples formed in my machine; Fig. 30, a view of the staple after it has been clenched.

My invention relates to an improved staple-stitching machine designed with particular reference to stitching the leaves of books and pamphlets together with wire, the object being to produce, at a low cost for manufacture, a compact and effective machine constructed with particular reference to simplicity, fewness of parts, and ease and convenience of attention and repair and adapted to be adjusted to meet the requirements of practically all of the work ever done in machines of this class, the machine in that respect virtually taking the place of several machines.

With these ends in view my invention consists in a staple-stitching machine having certain details of construction and combinations of parts, as will be hereinafter described, and pointed out in the claims.

In carrying out my invention I shall describe the several features of my machine in the order in which they operate, beginning with the feeding of the wire, and ending with the clenching of the completed staple.

As herein shown, the staple-wire is introduced into the machine in the form of a coil A on a spool A', mounted on a horizontal stud $A^2$, located at the upper end of an arm $A^3$, rising above the bed B of the machine. From the said spool the wire is led from left to right down over a longitudinally-bowed rigid reversing-guide $A^4$, upon which the wire is bent in the opposite direction from which it lay in the coil. The upper end of the guide is extended under and in close proximity to the coil, so as to take the wire from the inner portion of the outer periphery thereof, whereby the outside of the wire as it lies in the coil becomes the outside of the wire in the finished staple. The said reversing-guide is furnished with a series of outwardly-projecting pins $a$, containing perforations through which the wire is led. The said guide is also furnished with several grooved antifriction-rollers $a'$, which support and guide the wire at points between the pins.

From the lower end of the reversing-guide the wire enters into a wire-straightening apparatus comprising three straightening-rolls $a^2$, $a^3$, and $a^4$, the rolls $a^2$ and $a^3$ being located in the same horizontal plane and mounted in a box $a^5$, having an arm $a^6$, by means of which it is rigidly attached to the machine-frame B. The reversing-guide $A^4$ is formed integral with the box $a^5$, as well as the said arm $a^6$, the guide being therefore supported solely by the box. The straightening-roll $a^4$ is mounted in a vertically-movable slide $a^7$, having bearing in the upper and lower ends of the said box, and threaded at its upper end to receive a nut $a^8$, by means of which it is adjusted up and down to increase or decrease the separation between the straightening-roll $a^4$ and the straightening-rolls $a^2$ $a^3$.

I would call attention to the fact that all of the wire in the coil passes over the reversing-guide $A^4$ and is bent thereby in the opposite direction from which it lay in the coil. The action of the guide is alike upon all of the wire, so that the same comes to the straightening-rolls in uniform condition, which it would not do except for the reversing-guide, inasmuch as some portions of the wire leave the coil more bent than others, according to its position therein. The reversing-guide therefore compensates for the constantly-changing diameter of the coil of wire from the time it is put into the machine until it is exhausted. In the absence of the reversing-guide or equivalent means for bringing the wire into uniform condition before it enters the straightener the same must be frequently adjusted to correspond to the condition of the wire, calling for constant attention to the machine and a degree of skill which the ordinary operator does not have.

After leaving the wire-straightening apparatus the wire passes through horizontal perforations $c\ c$, formed in the upwardly-extending arms $c'\ c'$ of a wire-supporting block C, which is secured by screws $c^2\ c^2$ to a sliding feed-block C', which is actuated back and forth in a horizontal plane in an opening B', formed in the frame of the machine. The wire is gripped between the arms $c'\ c'$ by means of a dog $C^2$, having its lower edge serrated, and hung upon a pivot $C^3$, mounted in the block, the upper end of the dog being provided with a rearwardly-extending horizontal shaft $c^3$, Fig. 10, which passes through a transverse horizontal cylindrical opening $c^4$, formed in the block and of larger diameter than the diameter of the shaft, as clearly shown in the drawings. The projecting rear end of this shaft is connected by a short solid link $C^4$, Fig. 1, with the lower end of the longer arm of a bell-crank lever $C^5$, hung upon a screw $C^6$, entering the arm $A^3$ aforesaid, and having its upper and shorter arm connected with the lower end of the link $C^7$, the upper end of which is swiveled upon a non-rotatable small T-shaped stud $C^8$, located in an undercut slot $C^9$, radially arranged in a disk $C^{10}$. (Shown in detail in Fig. 16.) A hand-clamp $C^{11}$, mounted upon the threaded outer end of the stud, is provided for binding the same to the disk in any desired position in the slot thereof. Under this construction the throw of the sliding block, and hence the length of wire fed at any one operation thereof, may be regulated. The disk $C^{10}$ is located at the forward end of a shaft $C^{12}$, supported in bearings $C^{13}\ C^{13}$ and having its rear end provided with a bevel-gear $C^{14}$, meshing into a corresponding gear $C^{15}$, mounted upon the main shaft D of the machine.

By means of the connection of the dog $C^2$ with the bell-crank lever $C^5$ a slight rocking movement is imparted to the dog, whereby the same is slightly lifted during the outward movement of the block toward the straightening mechanism and depressed so as to grip the wire during the inward movement of the block away from the said mechanism.

I would call particular attention to the fact that the gripping of the wire by the dog precedes the starting of the sliding block in its inward or feeding movement, for the reason that the dog must come to rest either upon the wire or upon the wire-supporting block C before the bell-crank lever can secure any purchase upon the block. Furthermore, the disengagement of the dog from the wire must, under the construction just above described, precede the starting of the sliding block in its outward or return movement, for the bell-crank lever secures no purchase on the block until it has brought the shaft $c^3$ to bearing against the outer portion of the wall of the cylindrical opening $c^4$, which, as before mentioned, is considerably larger than the shaft. The dog $C^2$ of course follows the described movement of the shaft $c^3$, and is thus lifted away from the wire before the block begins its outward or return movement. I am thus able to secure an absolutely positive gripping of the wire preparatory to feeding the same and an equally positive disengagement of the wire preparatory to taking a new hold.

To compensate for the wear of the block in the operation of the machine and also to cause the block to operate under some friction, I prefer to set into its upper edge a friction-shoe $c^5$, which is constantly pressed against the adjacent bearing-surface of the frame by means of two small spiral springs $c^6\ c^6$, which impose the required restraint upon the sliding movement of the block as well as take up any wear which may occur. If the friction-shoe were not employed and the block, owing to wear, got to moving too easily, the block might start first and before the depression or elevation of the dog and cause inaccurate and unreliable feeding of the wire.

From the feeding mechanism the wire passes to a stop mechanism, Fig. 11, the function of which is to prevent the wire by any chance from being drawn back during the return movement of the sliding block. This stop mechanism, as shown, consists of a small toothed wheel E, located just below the plane in which the wire travels and mounted upon a screw-stud E', entering the frame of the machine. The said mechanism also comprises a toothed pawl $E^2$, hung upon a stud $E^3$ and having its upper and lower ends, respectively, connected with springs $E^4$ and $E^{4a}$, which exert a constant effort to force the toothed lower end of the pawl upon the wire. The lower end of the pawl is located forward of a vertical line passing through the center of the stud $E^3$, on which it is hung, so that although the pawl will yield for the inward movement of the wire it will immediately grip the same in case the wire starts to moving outward, the wire pulling the pawl down toward the wheel with the effect of pinching the wire between the wheel and pawl. The wheel, it will be noted, rotates freely under the friction derived from the inward movement of the wire caused by the pressing of the pawl on the same under the action of the spring thereof. I do not, however, limit myself to using this stop mechanism or any stop mechanism, for it may be dispensed with or replaced by other equivalent devices.

From the stop mechanism the wire passes onto the cutting-off mechanism, Figs. 1, 12, 13, 14, and 15. As herein shown, this mechanism employs a disk-shaped cutter $e$, having four open cutting-notches $e'$ formed in its periphery, and an annular cutter $e^2$, corresponding in diameter to the diameter of the cutter $e$, and having eight equally-spaced holes $e^3$ formed in it. The annular cutter $e^2$ is rigidly secured in a recess $e^4$, formed in the inner end of a cutter-box $e^5$, by means of pins $e^6\ e^6$, passing through two of its openings $e^3$, which are thus utilized for rigidly securing it in place. The disk-shaped cutter $e$ bears directly against the annular cutter $e^2$ and is secured by means of a screw $e^7$ to the inner end of a rock-shaft $e^8$, having bearing in a cylindrical passage $e^9$, extending throughout the length of the cutter-box $e^5$, the opposite end of the said shaft receiving a screw $e^{10}$, passing through a retaining-washer $e^{11}$, let into a recess $e^{12}$, formed in the outer end of the cutter-box. The rock-shaft is prevented from being moved endwise by the washer $e^{11}$ on the one hand and the disk-shaped cutter $e$ on the other. The screw $e^{10}$ is also used to keep the cutter $e$ drawn up into close contact with the annular cutter $e^2$. The object of providing the annular cutter $e^2$ with a plurality of holes $e^3$ and of providing the disk-shaped cutter $e$ with a plurality of notches $e'$ is to adapt them to be shifted to bring new cutting edges into play when the cutters become worn.

It will be understood of course that the wire is held against lateral movement by the annular cutter $e^2$, while the disk-shaped cutter $e$ is oscillated to cut it off. The rock-shaft $e^8$ is oscillated by means of a geared segment $e^{13}$, mounted in it, as shown in Fig. 12, and extending outward through a slot $e^{14}$, formed in the upper edge of the box and meshed into by a segment of a gear $e^{15}$, mounted on a shaft $e^{16}$, and actuated by an arm $e^{17}$, (also seen in Fig. 2,) the said arm being connected with the lower end of a link $e^{18}$, the upper end of which is pivotally connected with the forward end of the driving-bar lever $E^5$. The cutter-box $e^5$ is constructed near its lower edge with a horizontal slot $E^6$, receiving a screw $E^7$, by means of which the box is adjustably secured to the frame of the machine, the outer end of the screw being furnished with a washer $e^{19}$, which engages with the outer face of the box. The segment of a gear $e^{15}$ is normally maintained in a position of readiness for operation by means of a spring $E^8$, connected with its upper edge, while the rotation of the rock-shaft under the action of the spring $E^8$ is limited by means of a set-screw $E^9$, mounted in the cutter-box, as shown in Fig. 12.

From the cutting-off mechanism the wire passes to the anvil F through a flaring opening $f$, formed in the outer side of the anvil-holder $f'$, as seen in Fig. 20. The inner edge of the anvil has an inwardly-opening horizontal transverse groove $f^2$ formed in it to receive the wire, while above this groove the anvil is constructed with a beveled operating-face $f^3$ for its engagement and retirement by the extreme lower end of the staple-driver G. The anvil is furnished with an outwardly-extending shank F', the outer end of which projects outward through the anvil-holder and receives two check-nuts $f^4\ f^4$. A spiral spring $f^5$ located within the holder and encircling the said shank, exerts a constant effort to move the anvil inward, the extent of its inward movement, under the action of the spring, being regulated by the adjustment of the check-nuts before mentioned.

The anvil-holder $f'$ is secured by two screws $f^6\ f^6$, Fig. 1, to the lower end of the vertically-arranged barrel B², cast integral with the head of the frame B of the machine and forming a housing for the vertically-movable tubular staple-forming bar F², which in turn forms a housing for the vertically-movable staple-driver bar G', to the lower end of which the staple-driver G is secured. A clearance-opening $b$, Fig. 3, is formed in the lower end of the housing at a point opposite the opening $f$, formed, as before mentioned, in the anvil-holder $f'$, the opening $f$ admitting the wire to the anvil and the opening $b$ allowing it to project through the same.

The staple-driver G consists of an oblong rectangular flat steel plate secured by screws $g$ $g$ to the lower end of the staple-driver bar, which is cut away, as at G², Fig. 26, for the purpose. The said driver is wider than the diameter of the said staple-driver bar, so that its edges overhang the same, as clearly shown in Figs. 25 and 27. The said projecting edges of the staple-driver enter oppositely-located corresponding grooves $f^7$ $f^7$, formed in the forming-bar F², as clearly shown in Fig. 27. These grooves also receive the ends of the staple-lengths of wire and guide and support the same. The lower end of the staple-forming bar is constructed with a centrally-arranged vertical slot F³, opening downward and forward and rearward, as shown in Fig. 23. The forward face of the lower end of said bar is also cut away to form two long vertical bearing-faces F⁴ F⁴, located in the same vertical plane with each other, and also in the same vertical plane as the outer face of the staple-driver G.

At its extreme lower end the forming-bar is cut away on opposite sides of its slot F³ and furnished with two depending pivotal pawl-like gages F⁵ F⁵, hung upon horizontal screws F⁶ F⁶ and stopped against rearward movement by stop-pins $f^8$, one of which is seen in Fig. 21. The said stop-pins are located and arranged so that the rearward movement of these pivotal gages stops when their forward edges are in line with the rear walls of the grooves $f^7 f^7$. The said slot F³, formed in the lower end of the forming-bar, is designed for the reception of a supporting-block H, having an upwardly-extending shank H', by means of which it is hung upon a horizontal pivot H², mounted in the rear portion of the staple-forming bar. The said shank terminates at its upper end in a tail H³, which is engaged by the inner end of an adjusting-screw H⁴, mounted in the head of the frame B of the machine, as clearly shown in Figs. 17 and 18. The function of this supporting-block is to support the formed staples from the time they are formed until they are driven, and it is constantly urged forward to perform this function by means of a spiral spring $h$, located in part in an inclined counterbore $h'$, formed in it, and also receiving a rod $h^2$, the outer end of which is pivotally attached to the center of the cross-piece of a yoke $h^3$, the ends of which are pivotally connected by screws $h^4$ with the lower end of the forming-bar. The block is held in its retired position until the formation of a staple by means of the engagement of its tail H³ with the screw H⁴.

The barrel B² has formed in one of its sides a long vertically-arranged slot F⁷, Fig. 19, receiving an attachment-block F⁸, which is secured to the staple-forming bar F² by means of screws F⁸ᵃ F⁸ᵃ. A shoulder or collar screw F¹⁰, passing through the said block into the forming-bar, carries a sliding block F¹¹, which is located in an elongated slot $f^9$, formed in the forward end of the forming-bar lever $f^{10}$, which is hung upon a stud $f^{11}$ and provided at its rear end with an antifriction-roll $f^{12}$, entering a cam-slot $f^{13}$, formed in one of the side faces of a cam $f^{14}$, mounted upon the main driving-shaft D. The opposite side of the forming-bar has a slot $g'$ formed in it for the clearance of an attachment-block $g^2$, secured by a screw $g^3$ to the staple-driver bar G'. A shoulder or collar screw $g^4$, passing through the said block into the driver-bar, carries a sliding block $g^5$, located in a slot $g^6$, Fig. 19, formed in the forward end of the driver-bar lever E⁵, which is hung upon a screw-stud E¹⁰ and provided at its rear end with an antifriction-roll E¹¹, traveling in a cam-slot E¹², formed in the opposite face of the cam $f^{14}$ from the cam-slot $f^{13}$ aforesaid.

It may now be explained that at the time the sliding block of the feeding mechanism is feeding the wire into the anvil the forming-bar and the staple-driver bar are moving upward, the former in advance of the latter. The wire is fed over the flat outer face of the staple-driver and over the flat bearing-faces F⁴ F⁴ of the forming-bar and is not cut off by the cutting-off mechanism until after the forming-bar has reached the limit of its upward movement and is at rest. The wire is cut off at a time just before the staple-driver reaches the limit of its upward movement. As the lower end of the staple-driver lifts above the groove $f^2$ in the anvil and into range with the beveled operating-face $f^3$ thereof the anvil begins to be moved by its spring $f^5$. When the staple-driver passes above the anvil altogether, the same snaps inward, so to speak, under the action of its spring, whereby the ends of the cut of staple-length of wire which it carries are brought against the forward edges of the pivotal gages F⁵ F⁵, depending from the forming-bar, which stops in position to bring the said gages into position to be engaged by the wire when the anvil snaps inward. The function of these gages, it will be understood, is to arrest the ends of the wire in line with the forming-grooves $f^7 f^7$ in the forming-bar, the lower ends of the grooves being at this time above the ends of the wire. The forming-bar now begins its descent and engages with the projecting ends of the staple-length of wire and bends the same into a staple, the prongs I I of which, Fig. 30, are formed within the said grooves. The staple-driver now engages with the beveled operating-face $f^3$ of the anvil and pushes the same outward out of the way and so as to disengage it entirely from the newly-formed staple, which was supported by its crown in the anvil while its prongs were being bent by the forming-bar.

After the forming-bar has descended far enough to bend the staple-length of wire into the form of a staple, and after the anvil has been pushed out of the way, as described, the tail $H^3$ of the supporting-block H passes below the screw $H^4$ and is released, whereby the spring $h'$ is permitted to act to swing the block forward into the slot $F^3$ of the forming-bar, so that the upper edge of the block will engage with the inner face of the crown $I'$ of the staple and so that the sides of the block will pass between the prongs I I of the staple and, so to speak, box the said prongs into the grooves $f^7 f^7$ in the forming-bar. The formed staple now being supported and held by the supporting-block the driver descends and engages with its crown, immediately after which the forming-bar begins to descend again. Both the forming-bar and staple-driver now descend, but the forming-bar keeps in advance of the staple-driver and stops first, coming to rest upon the paper to be stitched and remaining at rest until after the prongs of the staple have been forced through the paper and its crown has been pressed down thereupon. During the driving of the staple its prongs are supported by the forming-bar and its crown by means of the staple-driver and the supporting-block, which is gradually retired or pushed back out of the way by the downward pressure of the staple-driving bar upon its upper edge.

It may be noted here that when in the descent of the forming-bar the pivotal gages strike the paper they turn on their pivots and fold up out of the way, swinging down again into position to do their work when the forming-bar is again raised. The forming-bar and staple-driver are now raised, and during their elevation the wire is fed again and the operations above set forth are repeated. During their upward movement the tail $H^3$ of the supporting-block is reëngaged with the screw $H^4$, whereby the block is held back out of the way, against the tension of its spring $h'$.

The prongs of the staple are clenched upon a clencher J, which is secured by means of screws $j\ j$ to the long upper portion $J'$ of a clencher-holder rod, which also comprises a short lower portion $j'$, the two portions of the rod being adjustably connected together, as will be described later on. The said rod is mounted in a housing K, located at the outer end of the table-supporting arm $K'$, which springs from the lower end of the column $B^4$. The lower end of the lower portion $j'$ of the said rod is slotted to receive the forward end of a connecting-lever $J^2$, hung upon a stud $J^3$ and having its rear end connected to a clencher-link $J^4$, the upper end of which is attached to a clencher-rod $J^5$, the upper end of which is connected to a clencher-cam roll-holder $J^6$, carrying an antifriction-roll $J^7$, coacting with the clencher-cam $J^8$, which is formed upon the edge of the cam $f^{14}$, before mentioned. Two springs $J^9 J^9$, bearing upward on the holder $J^6$, are supported at their lower ends upon the head of a hollow bolt $J^{10}$, which secures the machine-head $B^3$ to the upper end of the column $B^4$, as shown in Fig. 3, in which it will be seen that the clencher-rod $J^5$ passes upward through this hollow bolt.

The clencher J moves up and down in a vertical passage formed in the center of a rectangular table-locating block L, which is secured by means of screws $l\ l$ to a table-rest $l'$, from which a heavy externally-threaded stem $L'$ depends, the said stem entering the upper end of the housing K and passing through a hand-wheel $L^2$, having bearing upon the upper end of the said housing and provided for raising and lowering the block, as required. The housing K is split vertically and provided at its edges with lugs $k\ k$, receiving the threaded stem of a clamping-wheel $k'$, by means of which the housing is clamped upon the threaded stem $L'$ when the same has been adjusted by the hand-wheel $L^2$. A hand-screw $L^3$, located below the clamping-wheel $k'$, enters a vertically-arranged bushing $L^4$, which receives the lower end of the long upper portion $J'$ of the clencher-rod and the upper end of the short lower portion thereof, the said ends of the two portions of the rod being semicircular in shape, with their flat faces arranged in contact and pressed together by means of the hand-screw $L^3$, which couples the said ends together through the medium of the bushing.

The table M, upon which the work is done, is oblong in plan view and has the form of a right-angle triangle in cross-section. It is hollow in construction and formed with a central longitudinally-arranged oblong rectangular opening $M'$, corresponding to the rectangular form of the table-locating block L, over which it fits. The said table may be reversed in position, so as to form a flat table, as shown in Fig. 2, or a sloping table, as shown in Fig. 3, the table in either case resting upon the table-rest $l'$, to which the table-locating block L is secured, as aforesaid. By this construction of table I secure a rigid sloping surface of perfect form for stitching through the folds of pamphlets, &c., while by reversing the table I secure a rigid flat surface, perfectly adapted to stitching through the sides or faces of pamphlets and books at their edges. The reversal of the table from one position to the other is very quickly effected, and it is much more solid and stable in either position than a table hinged and lifted to form a horizontal surface or dropped to form a sloping surface.

It will be understood that when the machine is set the table will be adjusted in height according to the thickness of the work to be done, but before the table is adjusted the hand-screw is reversed, so as to permit the engaged portions of the clencher-rod to slide loosely upon each other. Then after the table has been adjusted the hand-screw is tightened, so as to clamp the engaged portions of the rod together again. In this way the position and throw of the clencher are made to correspond with the adjustment of the table.

The table-locating block L is constructed with a centrally-arranged vertical socket $l^4$, opening downward, and at its upper end intersecting the center of a narrow vertically-arranged longitudinal slot $l^2$, formed in the beveled upper end of the block, as shown in Fig. 8. The upper end of the clencher is located in the slot $l^2$, while its lower end extends downward into the socket $l^4$, which also receives the upper end of the upper portion J' of the two-part clencher-holder rod already described.

A pair of guiding-plates N N, corresponding to each other, are hung by their lower ends on pins $n$ $n$ on opposite sides of the upper end of the clencher and within the slot $l^2$, the inner ends of these guiding-plates being concaved to receive the head of the clencher, by which the plates are operated in being swung outward away from each other and inward toward each other. The inner upper corners of the plates are beveled, as at $n'$ $n'$, the prongs of the staples engaging with these bevels and being deflected inward thereby. When the clencher is elevated to do its work, the plates are pushed outward out of the way, but when it is depressed they are drawn inward again into position to inwardly deflect the prongs of the next staple.

The main shaft D is provided with a driving-pulley O, furnished with a clutch, which may be of any suitable construction, and which, as herein shown, comprises a clutch-head O' and a clutch-finger $O^2$, the latter being operated by a clutch-rod $O^3$, provided with a spring $O^4$, arranged to exert a constant effort to apply the clutch.

Inasmuch as the operation of the machine has been so fully set forth in connection with the detailed description of it, it seems unnecessary to further describe it.

It is apparent that in carrying out my invention changes from the particular construction herein shown and described may be made, and I would therefore have it understood that I do not limit myself to the particular form set forth, but hold myself at liberty to make such changes as fairly fall within the spirit and scope of my invention.

Having fully described my invention, what I claim as new, and desire to secure by Letters Patent, is—

1. In a staple-stitching machine, the combination with means for supporting a coil of wire, of a wire-straightening device comprising a box, and several straightening-rolls, and a rigid, longitudinally-bowed reversing-guide connected with the said box by which it is supported and extended upward therefrom in close proximity to the coil so as to take the wire from the inner portion of the outer periphery of the coil, and furnished with a series of outwardly-projecting pins containing perforations through which the wire is led, and also furnished with several grooved antifriction-rollers which support and guide the wire at points between the pins, substantially as described.

2. In a staple-stitching machine, the combination with a sliding block, of a wire-supporting block made independent thereof and secured thereto, a dog located directly above, and coacting with the wire-supporting block upon which it crowds the wire, a shaft secured to and extending horizontally rearward from the upper end of the dog through an opening formed in the sliding block and made larger in diameter than the diameter of the said shaft to permit the same to play laterally in it, and operating connections with the rear end of the shaft, whereby the dog is lifted and cleared from the wire prior to the beginning of the return or outward movement of the sliding block which does not begin to so move until the shaft has taken a bearing against the wall of the said opening, and whereby also the dog is crowded downward so as to grip the wire before the block starts, and before the shaft strikes the wall of the opening.

3. In a staple-stitching machine, the combination with a sliding block adapted to support the wire, of a dog arranged to grip the wire for feeding the same, and pivotally connected with the block, a small shaft extending rearward from the upper end of the dog through an opening of larger diameter formed in the block, and operating connections with the rear end of the shaft, substantially as set forth, and whereby the dog is lifted prior to the beginning of the return or outward movement of the block, which does not begin to move until the shaft has taken a bearing against the wall of the said enlarged opening formed therein.

4. In a staple-stitching machine, a feeding mechanism comprising a sliding block provided with a wire-supporting block, a dog coacting with the wire-supporting block, and pivoted to the sliding block, a shaft extending rearwardly from the upper end of the dog through an enlarged opening formed in the sliding block, a link connected with the projecting inner end of the said shaft, a bell-crank lever connected with the opposite end of the link, and means for oscillating the said lever, substantially as set forth, and whereby the dog is depressed to grip the wire preparatory to the inward, feeding movement of the block, and lifted to release the wire preparatory to the outward or return movement of the said block.

5. In a staple-stitching machine, a wire-cutting mechanism comprising a cutter-box, a rock-shaft located therein, an annular cutter having a plurality of cutting-openings formed in it, mounted in the box, a disk-shaped cutter having a plurality of cutting-notches formed in its edge to coöperate with the cutting-openings of the annular cutter, secured to said shaft in position to bear against the annular cutter, and means for oscillating the shaft, substantially as described.

6. A staple-supporting block for the staple-forming mechanism of a staple-stitching machine, the said block being constructed with an upwardly-projecting tail for holding the block in retirement until after the formation of the staple, substantially as set forth.

7. In a staple-stitching machine, the combination with a staple-forming bar, of means for reciprocating the same, a staple-driving bar located within the said staple-forming bar and provided at its lower end with a staple-driver, means for reciprocating the staple-driving bar independently of the staple-forming bar, an anvil with which the lower end of the staple-driving bar coacts, a staple-supporting block pivotally mounted in the staple-forming bar, and having an upwardly-projecting tail and adjustable means for holding the said block in retirement by its said tail until after the formation of the staple, when the block is released and allowed to swing into position for supporting the staple.

8. In a staple-stitching machine, the combination with a staple-forming bar, of a staple-supporting block pivotally mounted in the said bar and constructed with an upwardly-extending tail, and a screw mounted in the frame of the machine, in position to engage with the tail of the block for holding the block in retirement until after the formation of a staple when the tail of the block clears the screw and allows the block to swing between the prongs and under the crown of the staple.

9. In a staple-stitching machine, the combination with a staple-forming bar, of a supporting-block pivotally mounted in its lower end, and provided at its upper end with a tail, and means engaging with the tail for holding the block in retirement until after the formation of the staple, when the tail is relieved and the block allowed to come into position for supporting the staple, substantially as described.

10. In a staple-stitching machine, the combination with a vertically-movable staple-forming bar, of a staple-supporting block pivotally mounted therein and moved up and down thereby, a spring arranged to exert a constant effort to swing the block between the prongs of the staple, and under the crown thereof, and adjustable means mounted in the frame of the machine for engaging with the block above its pivot to hold the block in retirement until after the formation of a staple when the block is cleared from the said means and allowed to be swung by its spring under the staple.

11. In a staple-stitching machine, the combination with a staple-forming bar, adapted to form a staple at its lower end which is slotted, of a supporting-block pivotally mounted in the bar, means for engaging with the upper end of the block to hold the same in retirement until after the formation of the staple, after which the block is relieved and allowed to come into position for supporting the formed staple, and a yoke connecting the block and bar, and having a spring combined with it for operating the block, substantially as described.

12. In a staple-stitching machine, a reversible table of triangular cross-section, having a flat working face and also a doubly-beveled or saddle working face, and formed with a transverse opening whereby it is located in place in the machine, substantially as described.

13. In a staple-stitching machine, the combination with a reversible table of triangular cross-section, having a flat working face, and also having a doubly-beveled or saddle working face, and formed with a transverse opening; of a table-locating block having its upper end beveled to conform to the saddle working face of the table the transverse opening of which adapts it to be set down over the block, a table-rest to which the block is secured, and the edges of which project beyond the block for supporting the table, a downwardly-extending externally-threaded stem secured to the block, and means acting through the said stem for raising and lowering it and hence the table-rest and table.

In testimony whereof I have signed this specification in the presence of two subscribing witnesses.

FRANK S. BRADLEY.

Witnesses:
FRED. C. EARLE,
HENRY A. BEEBE.